ively is located in the rear of the axle 2
UNITED STATES PATENT OFFICE.

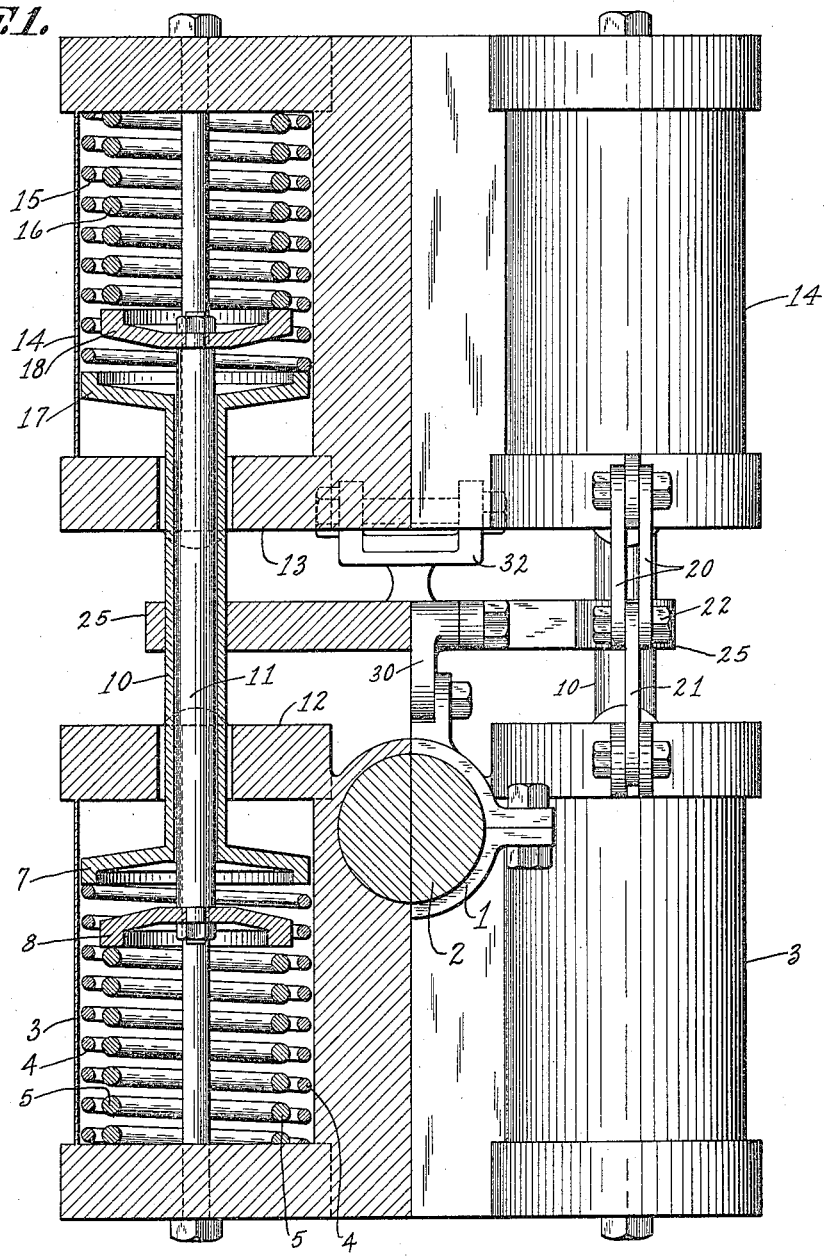

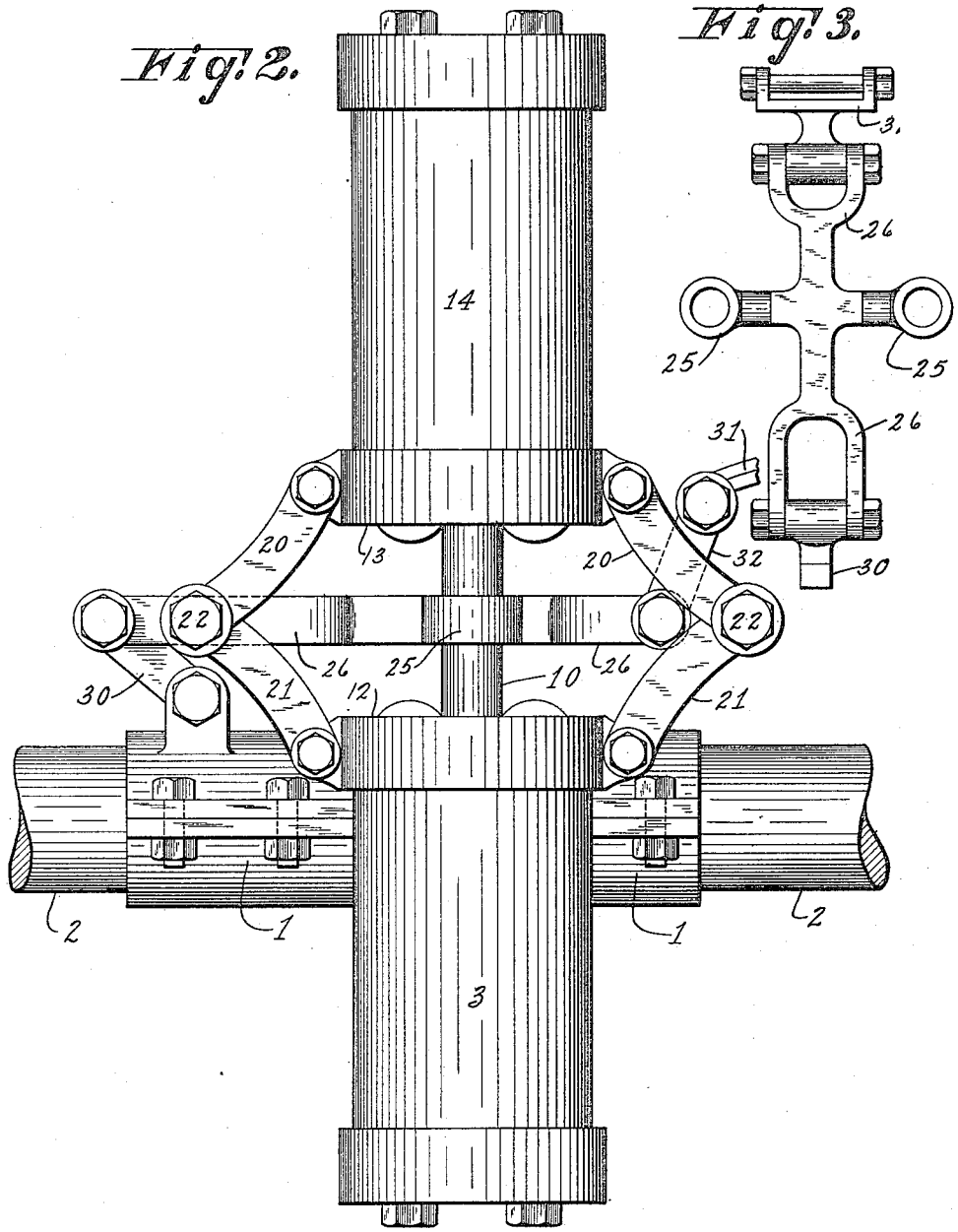

ANTHONY STOWASSER, OF MILWAUKEE, WISCONSIN.

SHOCK-ABSORBER.

1,169,578.  Specification of Letters Patent.  Patented Jan. 25, 1916.

Application filed May 29, 1915. Serial No. 31,138.

*To all whom it may concern:*

Be it known that I, ANTHONY STOWASSER, a citizen of the United States, residing at Milwaukee, county of Milwaukee, and State of Wisconsin, have invented new and useful Improvements in Shock-Absorbers, of which the following is a specification.

My invention relates to improvements in shock absorbers.

The object of my invention is to provide a form of construction adapted to afford resilient resistance to either upward or downward movement and in which the resistance will be not only increased in proportion to the spring compression, but additional resistance will be interposed after a predetermined degree of movement in either direction.

A further object of my invention is to provide means whereby a set of comparatively small shock absorbing units may be employed for coöperative action in connection with equalizing mechanism and means to facilitate connecting and supporting the shock absorbers from the axle of a vehicle.

In the drawings—Figure 1 is a side view, partly in elevation and partly in vertical section, of my improved shock absorbing apparatus, the axle of the vehicle being illustrated in cross section. Fig. 2 is a rear elevation of the same, showing a fragment of the axle of the vehicle and a fragment of a main spring. Fig. 3 is a detail plan view of the equalizing bar.

Like parts are identified by the same reference characters throughout the several views.

A clamping member 1 is adapted to embrace the axle 2 of a vehicle and to support therefrom a pair of vertically disposed cylindrical casings 3, each of which is provided with a set of coiled springs 4 and 5 respectively, said springs being concentrically arranged. Each of these springs is seated upon the bottom of the containing cylinder. The inner spring 5 is comparatively heavy and is somewhat shorter than the outer spring 4. The plunger head 7 bears upon the upper end of the outer spring and plunger head 8 bears upon the upper end of the inner spring, as clearly shown in Fig. 1, the plunger head 7 having a tubular actuating stem 10 through which a rod or stem 11, connected with the plunger head 8, passes. These stems extend loosely through apertures in the cylinder heads 12 and also enter similar apertured heads 13 of a superposed set of cylindrical spring containing casings 14. The casings 14 contain sets of coiled springs 15 and 16, which are like springs 4 and 5 respectively, but are seated against the upper ends of the cylinders 14. The inner or heavier springs 16 are supported upon plunger heads 18 corresponding in form with the plunger heads 8 in the cylinders 3, but occupying an inverted position and secured to the upper ends of the rods 11. Another plunger head 17 bears upon and supports the lighter coiled spring 15 in each of the cylinders 14, these plunger heads 17 corresponding with the plunger heads 7 in form and shape but being inverted and secured to the upper ends of the tubular stems 10. The upper cylinders are supported by the springs and plunger stems but they are flexibly connected with the lower cylinders by link rods 20 and 21 pivotally connected with the opposing cylinder heads and arranged in sets pivotally connected to each other at 22.

It will be observed in Fig. 1 that one pair of superposed cylinders 3 and 14 respectively is located in the rear of the axle 2 and another pair of like cylinders is located in front of the axle. The plunger stems 10 are connected above the axle by a cross head 25, the ends of which are rigidly connected with the stems 10 and centrally connected, preferably integrally, with an equalizing bar 26 which extends longitudinally of the axle to and directly above the latter with one end connected with the clamping bracket 1 by a link 30 and the other end connected with the main spring 31 of the vehicle by a link 32. The main spring 31 of the vehicle is connected with the vehicle frame, not shown, in the usual manner. A jolting movement imparted to the axle 2 will be transmitted to this main spring through the lower cylinders and initially through the lighter springs therein, the plungers 7 and plunger stems 10. If the jolt is a heavy one, the plungers 7 may move downwardly until they strike the plungers 8, after which the springs 5 will also be compressed. If the jolting movement is in the opposite direction, it will of course be received by the superposed springs in the upper cylinder. The equalizer bar 26 distributes the pressure upon the various springs. This bar is allowed a slight longitudinal movement in correspondence with the arcs in which the links 30 and 32 swing. The cylinder heads are therefore provided with apertures for the stems 10 of sufficient size to permit this slight lost motion.

It will be observed that by having all the springs continuously under tension and loosely linking the cylinders together in superposed pairs, the compression of the springs in either the lower or the upper cylinders will correspondingly relieve the tension upon the springs in the other set of cylinders and the recoil of the compressed springs will be absorbed by the compression of the relaxed springs. I am thereby enabled to not only cushion the shocks imparted to the springs, but to also cushion the rebound in a manner to relieve the main spring from excessive or sudden strains in any direction and prevent the transmission of violent throwing movements to the vehicle frame. It will of course be understood that any movements originating in the vehicle frame will be transmitted to the respective shock absorbing springs through the main spring 31.

It will be understood that my improved shock absorbing apparatus will be applied at both ends of the main spring and will be attached to the axle adjacent to the respective wheels of the vehicle.

I claim—

1. Shock absorbing apparatus for vehicles comprising a clamping bracket adapted to engage the vehicle axle, a set of spring containing cylinders connected with the bracket and respectively disposed in front and at the rear of said axle, a set of superposed spring containing cylinders linked to the first mentioned cylinders and adapted to move vertically with reference thereto, a set of coiled springs in each of the cylinders, a spring compressing plunger for each of said coiled springs, rods connecting the spring compressing plungers in each lower cylinder with the corresponding plungers in the upper cylinder, an equalizing bar centrally connected with one of said plunger connecting rods for each pair of superposed cylinders, a main spring connected with one end of said equalizing bar, and a link connecting the other end of said bar with the axle, substantially as described.

2. Shock absorbing apparatus for vehicles including the combination with a main spring and an axle, of a plurality of sets of superposed shock absorbing cushions supported from the axle in front and in the rear thereof, and an equalizing bar arranged to distribute the pressure exerted upon said cushions, the upper cushions being arranged to counteract the reactionary movements of the lower ones, substantially as described.

3. A shock absorber including the combination with a vehicle axle, of a pair of superposed spring cages carried thereby, springs in said cages, plungers adapted to compress the springs in opposite directions, a rod connecting said plungers, a tubular rod loosely inclosing the first mentioned rod and provided with spring compressing plungers, auxiliary springs in said cages, against which said last mentioned plungers are cushioned, and means for supporting a vehicle frame from said tubular rod.

4. A shock absorber including the combination with a vehicle axle, of a pair of superposed spring cages carried thereby, springs in said cages, plungers adapted to compress the springs in opposite directions, a rod connecting said plungers, a tubular rod loosely inclosing the first mentioned rod and provided with spring compressing plungers, auxiliary springs in said cages, against which said last mentioned plungers are cushioned, and means for supporting a vehicle frame from said tubular rod, each set of plungers being adapted to engage and actuate the other set after limited independent movement.

In testimony whereof I affix my signature in the presence of two witnesses.

ANTHONY STOWASSER.

Witnesses:
LEVERETT C. WHEELER,
IRMA D. BREMER.

Copies of this patent may be obtained for five cents each, by addressing the "Commissioner of Patents, Washington, D. C."